US012710267B2

(12) United States Patent
Song et al.

(10) Patent No.: US 12,710,267 B2
(45) Date of Patent: Aug. 18, 2026

(54) CAMERA DEVICE

(71) Applicant: LG INNOTEK CO., LTD., Seoul (KR)

(72) Inventors: Young Sik Song, Seoul (KR); Hyeon Yong Lee, Seoul (KR); Du Ri Jo, Seoul (KR); Sung Won Roh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 141 days.

(21) Appl. No.: 18/697,380

(22) PCT Filed: Sep. 30, 2022

(86) PCT No.: PCT/KR2022/014780
§ 371 (c)(1),
(2) Date: Mar. 29, 2024

(87) PCT Pub. No.: WO2023/055180
PCT Pub. Date: Apr. 6, 2023

(65) Prior Publication Data

US 2025/0052564 A1 Feb. 13, 2025

(30) Foreign Application Priority Data

Sep. 30, 2021 (KR) ........................ 10-2021-0130090
Nov. 12, 2021 (KR) ........................ 10-2021-0155813

(51) Int. Cl.
*G01B 11/25* (2006.01)

(52) U.S. Cl.
CPC .................................... *G01B 11/25* (2013.01)

(58) Field of Classification Search
CPC . G01B 11/25; G01B 11/2513; G01B 11/2531; G06T 7/521; H04N 13/254; H04N 13/271; H04N 13/207
See application file for complete search history.

(56) References Cited

U.S. PATENT DOCUMENTS 5,488,468 A * 1/1996 Kawanishi ............. G01C 3/085
356/3.02
6,713,756 B2 * 3/2004 Yamamoto ............... G01D 5/38
356/615

(Continued)

FOREIGN PATENT DOCUMENTS

KR 10-2015-0087612 A 7/2015
KR 10-2020-0049152 A 5/2020

(Continued)

*Primary Examiner* — Sang H Nguyen

(74) *Attorney, Agent, or Firm* — Birch, Stewart, Kolasch & Birch, LLP

(57) ABSTRACT

A camera device according to an embodiment of the present invention includes a light output unit which emits light signals having a predetermined pattern to an object, a light input unit which receives light signals reflected by the object, a depth map generation unit which generates a depth map of the object using the light signal input to the light input unit, and a control unit which controls the light output unit, the light input unit, and the depth map generation unit, wherein the light output unit includes a plurality of light sources including a first light source and a second light source, the light input unit includes an image sensor, the first light source and the second light source are symmetrically disposed with the image sensor interposed therebetween, the first light source outputs first light signals having a first pattern formed of a plurality of dots, the second light source outputs second light signals having a second pattern formed of a plurality of dots, and the plurality of dots forming the first pattern and the plurality of dots forming the second pattern are projected to positions which do not overlap mutually on the object.

13 Claims, 17 Drawing Sheets

(56) References Cited

U.S. PATENT DOCUMENTS

| | | | | |
|---|---|---|---|---|
| 7,193,731 | B2 * | 3/2007 | Nakano | G01D 5/28 |
| | | | | 356/602 |
| 11,063,407 | B1 * | 7/2021 | Ginzburg | H01S 5/0624 |
| 2003/0067537 | A1 | 4/2003 | Myers | |
| 2010/0020078 | A1 * | 1/2010 | Shpunt | G06T 7/521 |
| | | | | 345/420 |
| 2018/0033146 | A1 * | 2/2018 | Bleyer | G01B 11/2513 |
| 2018/0080761 | A1 * | 3/2018 | Takao | G01B 11/25 |
| 2019/0238824 | A1 * | 8/2019 | Lee | H04N 23/74 |
| 2019/0273907 | A1 * | 9/2019 | Cronie | H04N 13/25 |
| 2020/0265608 | A1 * | 8/2020 | Nakao | G06T 7/521 |
| 2021/0097321 | A1 * | 4/2021 | Xian | G01B 11/2513 |

FOREIGN PATENT DOCUMENTS

| | | | |
|---|---|---|---|
| KR | 10-2020-0113438 | A | 10/2020 |
| KR | 10-2021-0029269 | A | 3/2021 |
| WO | WO 2020/245397 | A1 | 12/2020 |

* cited by examiner

[FIG. 1]
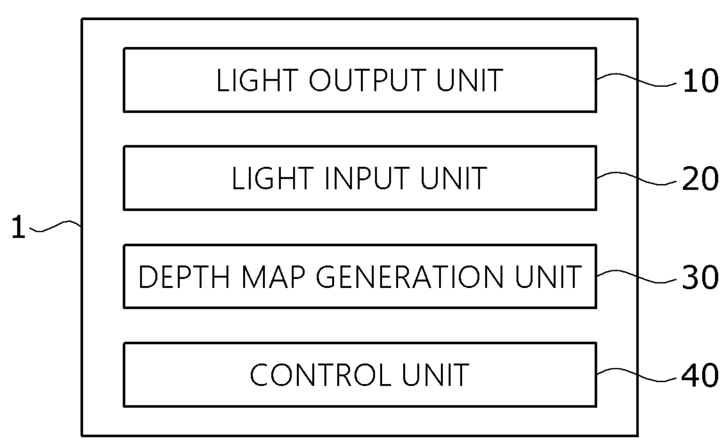
[FIG. 2]
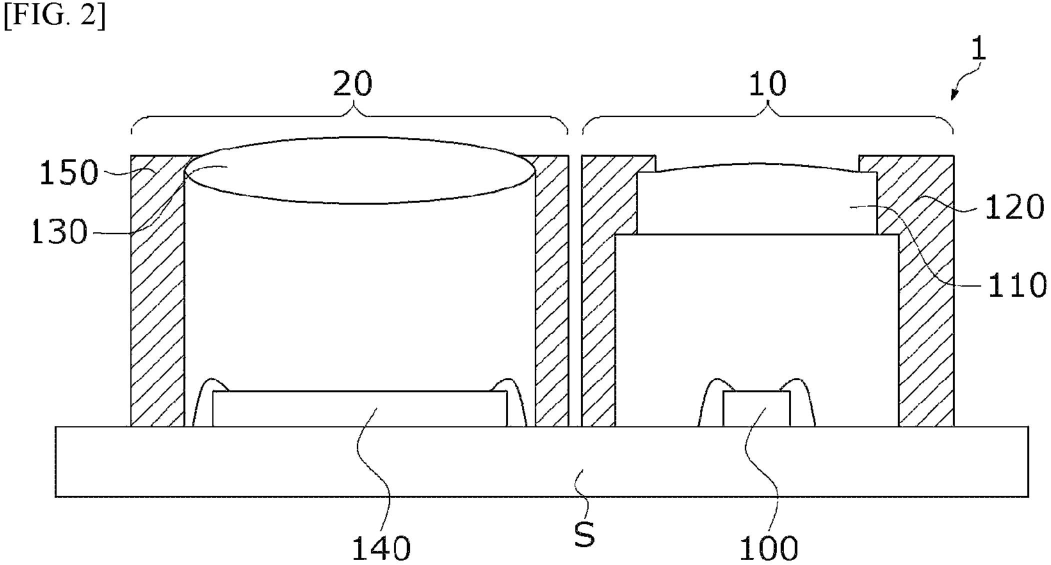

[FIG. 3]
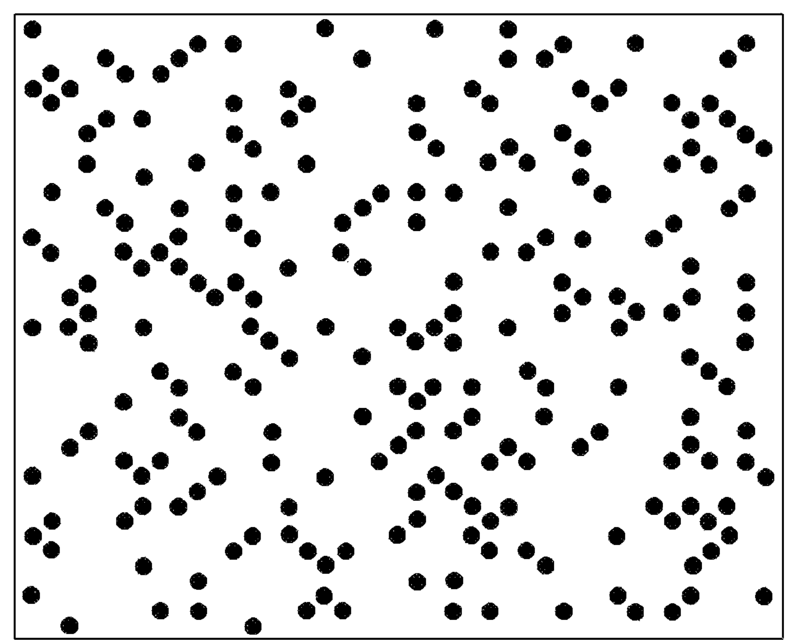
[FIG. 4]
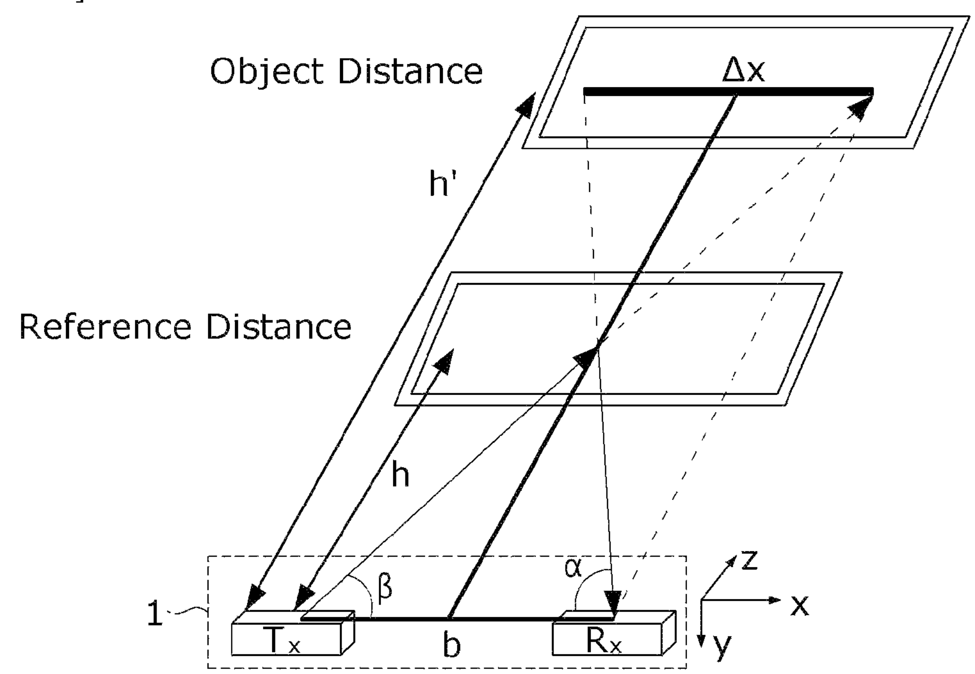

[FIG. 5]
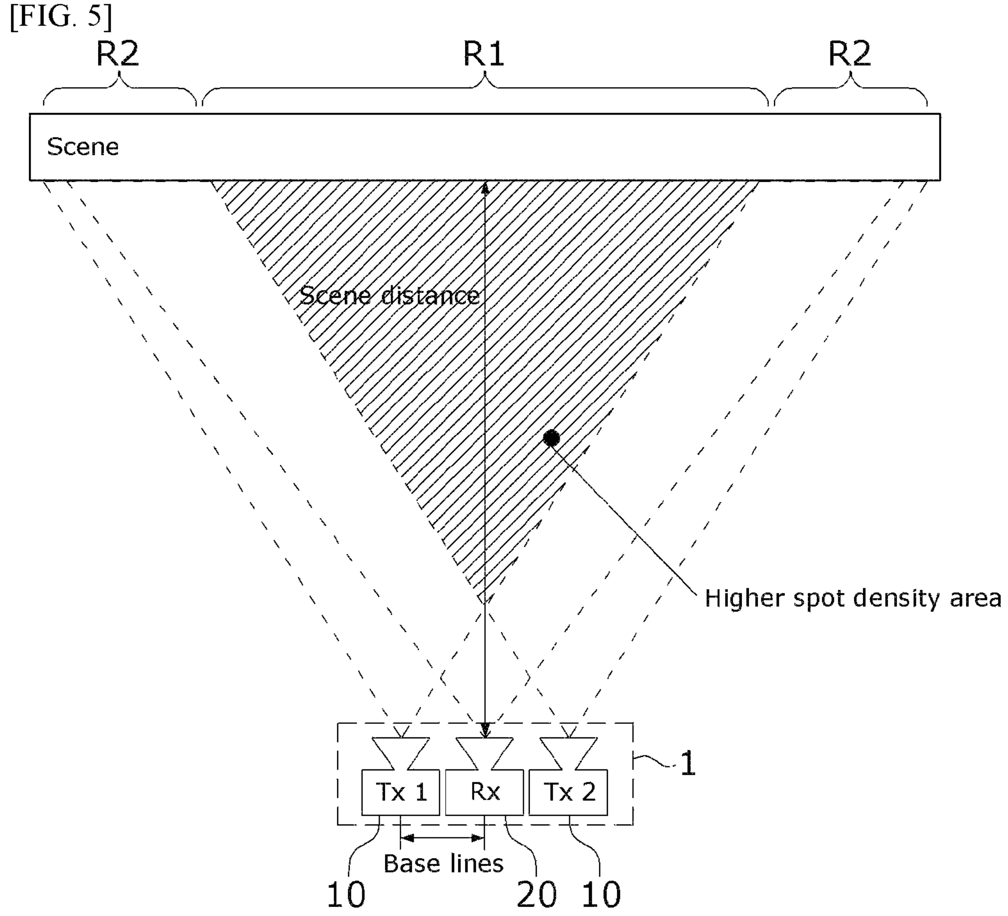

[FIG. 6]
(a) (b)
| Tx 5 | Tx 3 | Tx 7 |
| --- | --- | --- |
| Tx 1 | Rx | Tx 2 |
| Tx 8 | Tx 4 | Tx 6 |
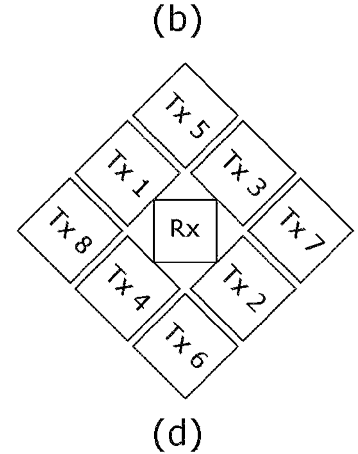
(c) (d)
[FIG. 7]
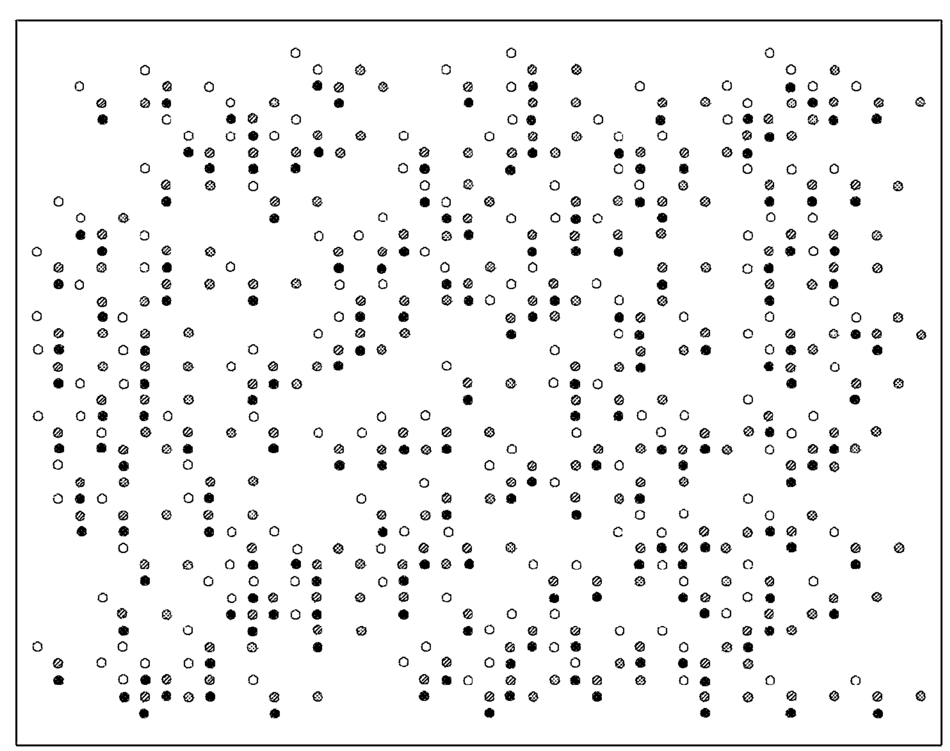

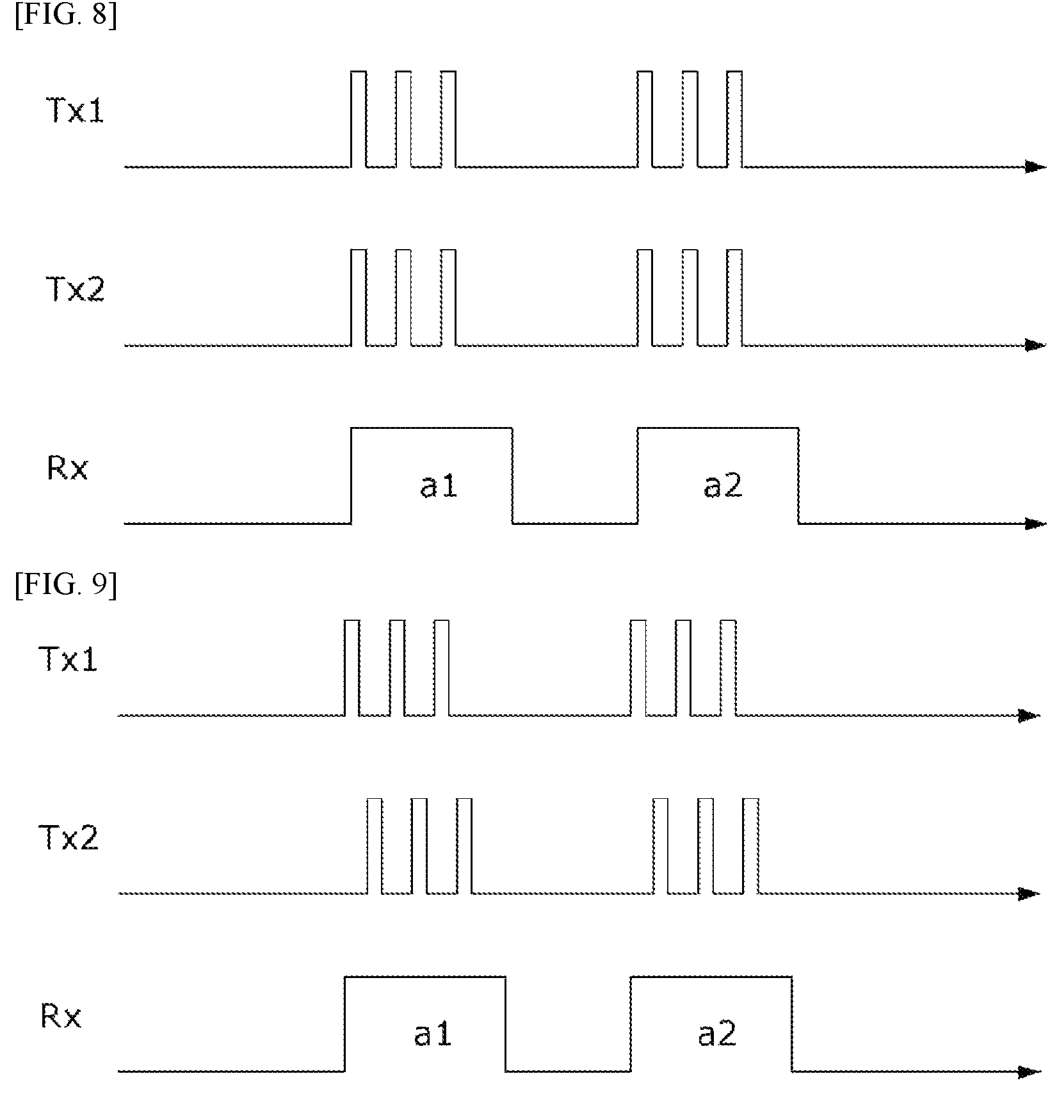
[FIG. 8]
Tx1
Tx2
Rx
a1
a2
[FIG. 9]
Tx1
Tx2
Rx
a1
a2

[FIG. 10]
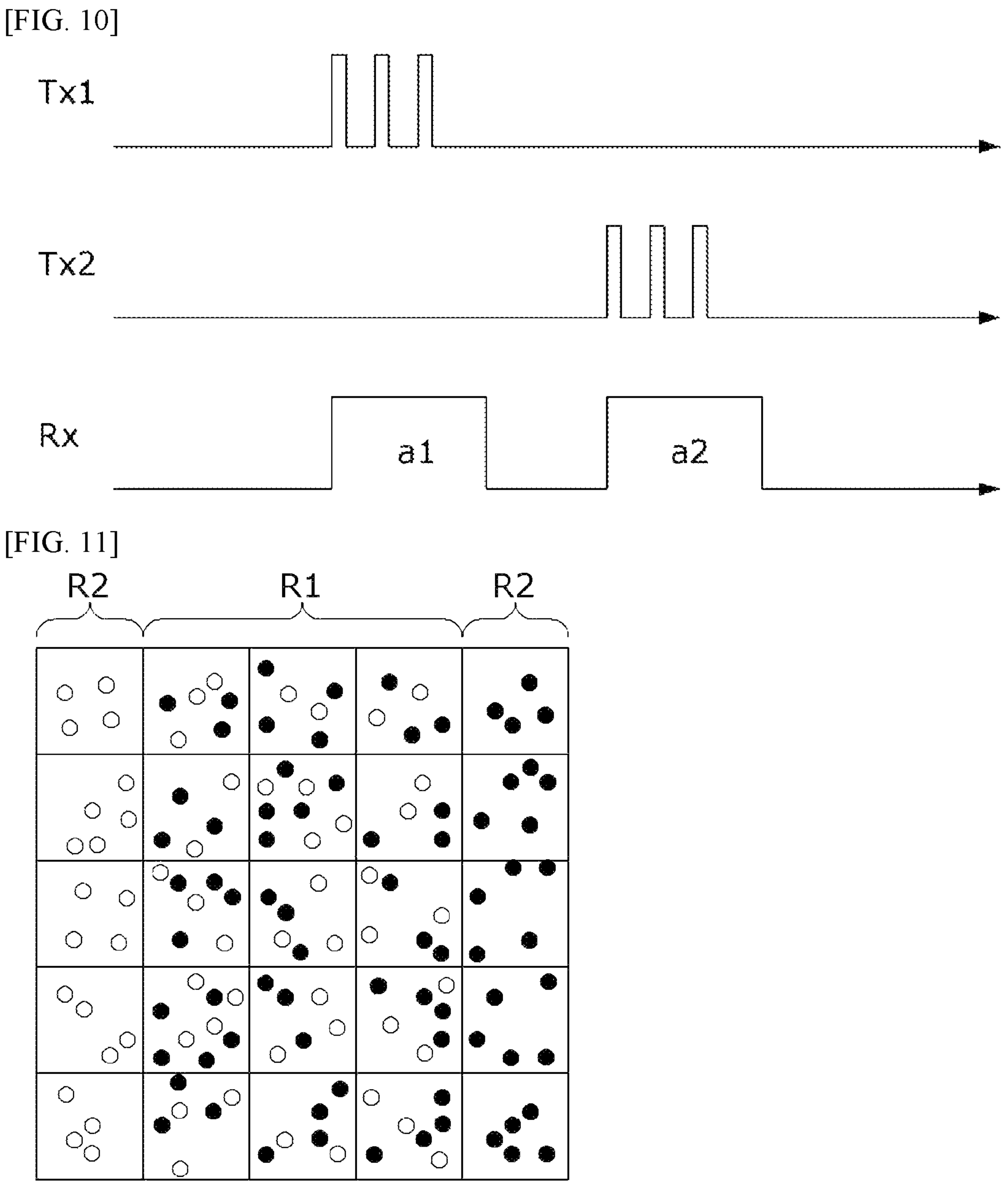
[FIG. 11]

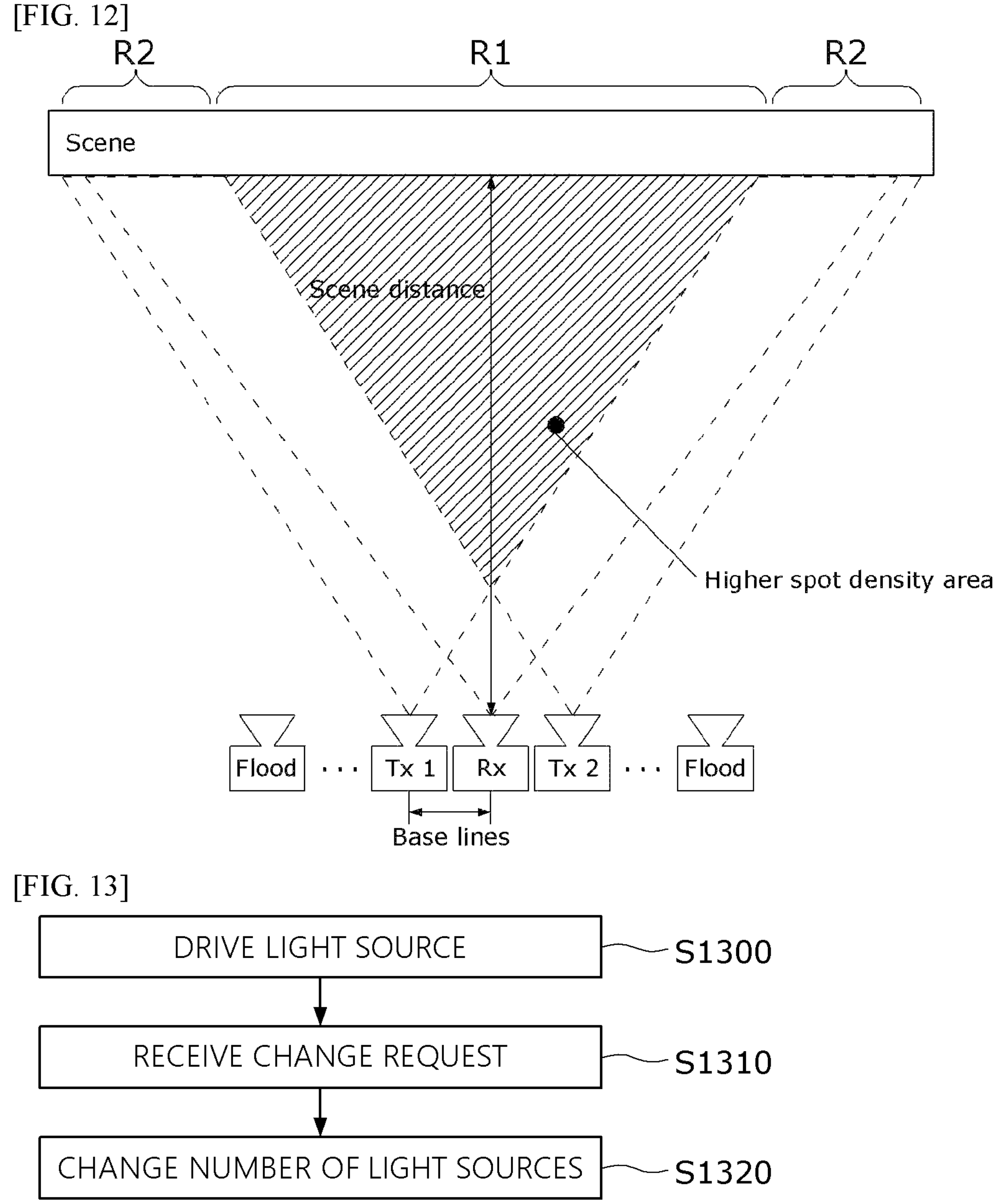
[FIG. 12]
R2
R1
R2
Scene
Scene distance
Higher spot density area
Flood
Tx 1
Rx
Tx 2
Flood
Base lines
[FIG. 13]
DRIVE LIGHT SOURCE
S1300
RECEIVE CHANGE REQUEST
S1310
CHANGE NUMBER OF LIGHT SOURCES
S1320

[FIG. 14]
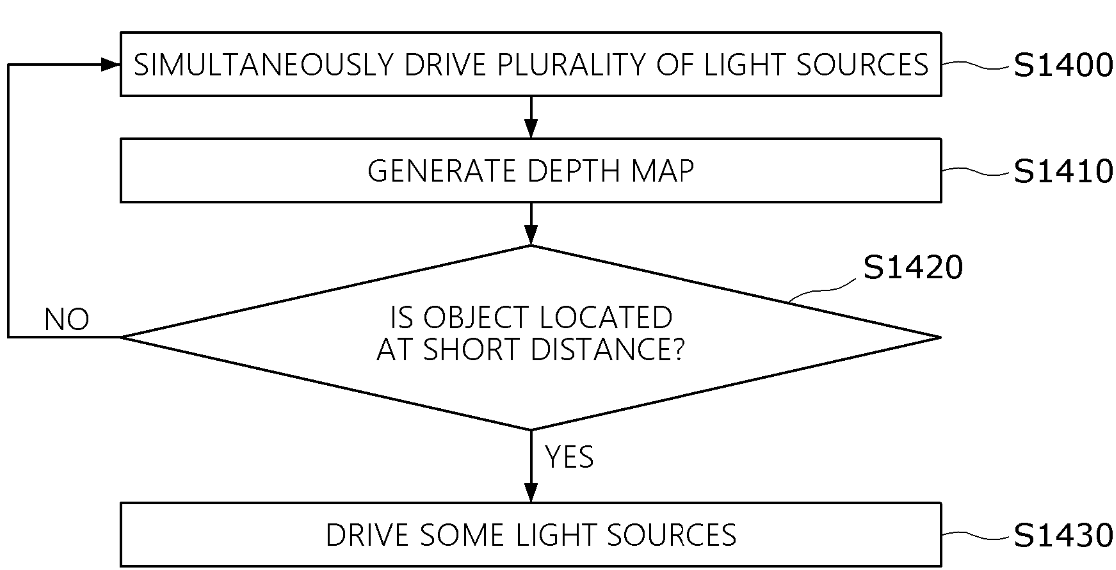

[FIG. 15]
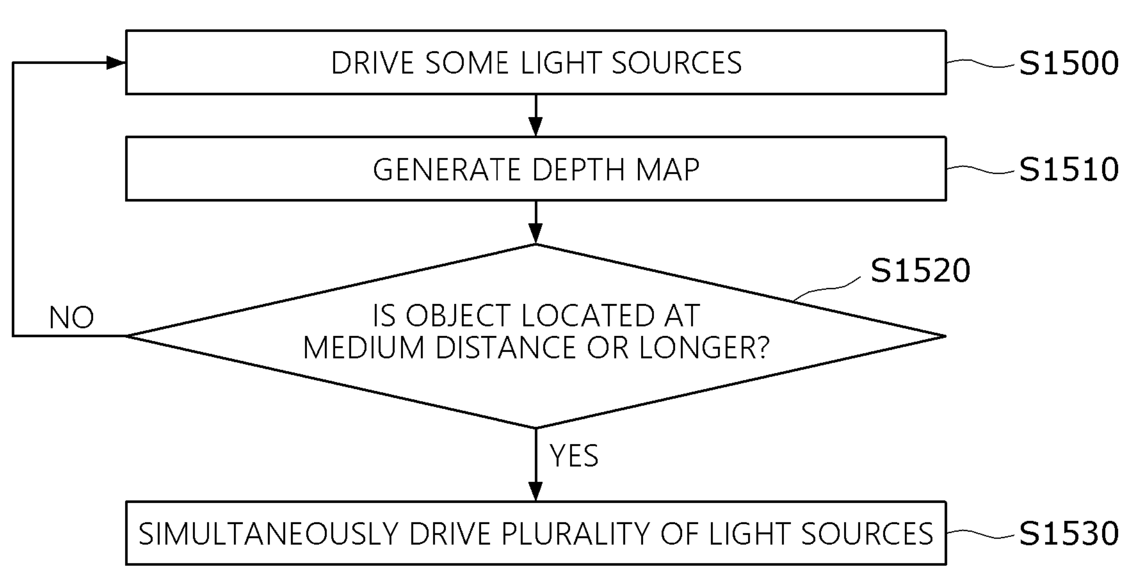

[FIG. 16]
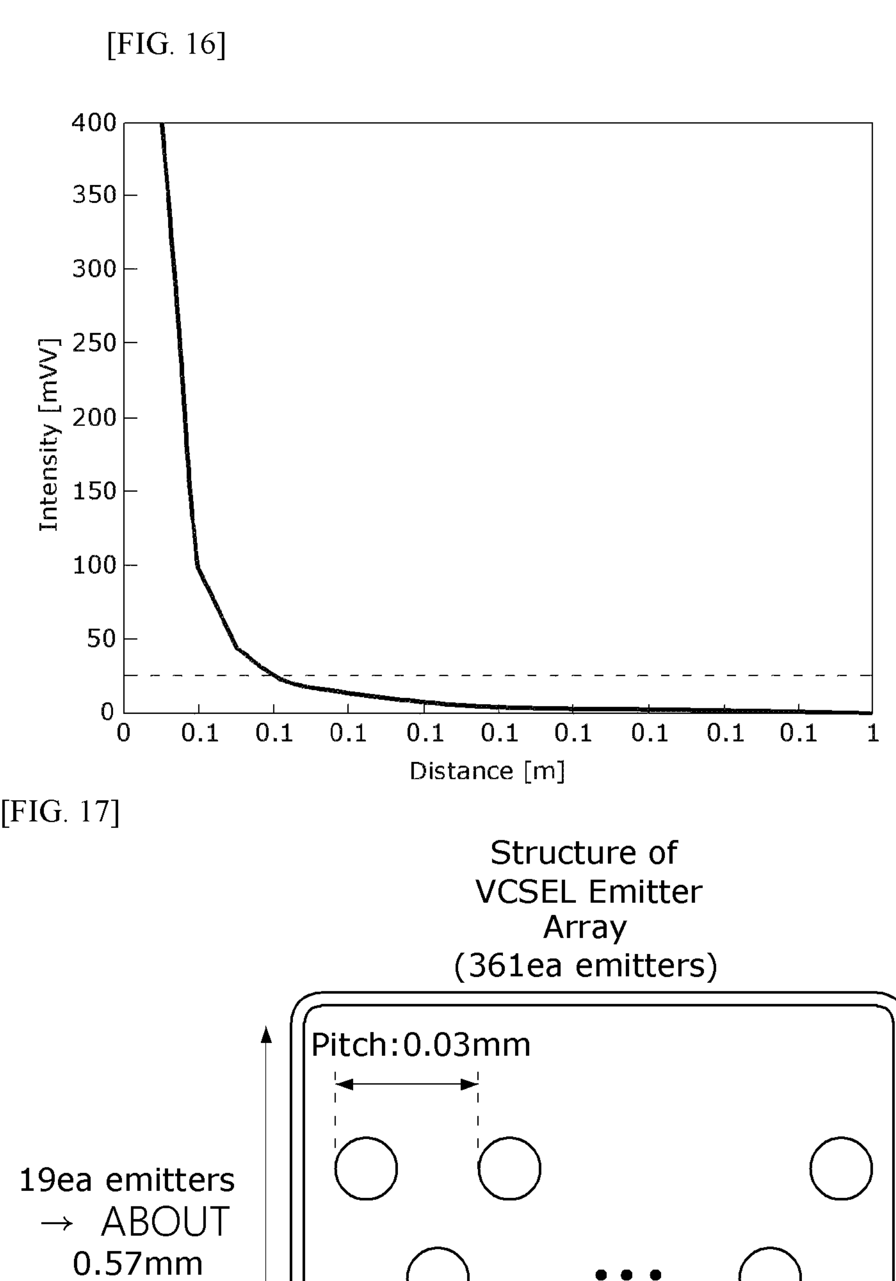
[FIG. 17]

[FIG. 18]
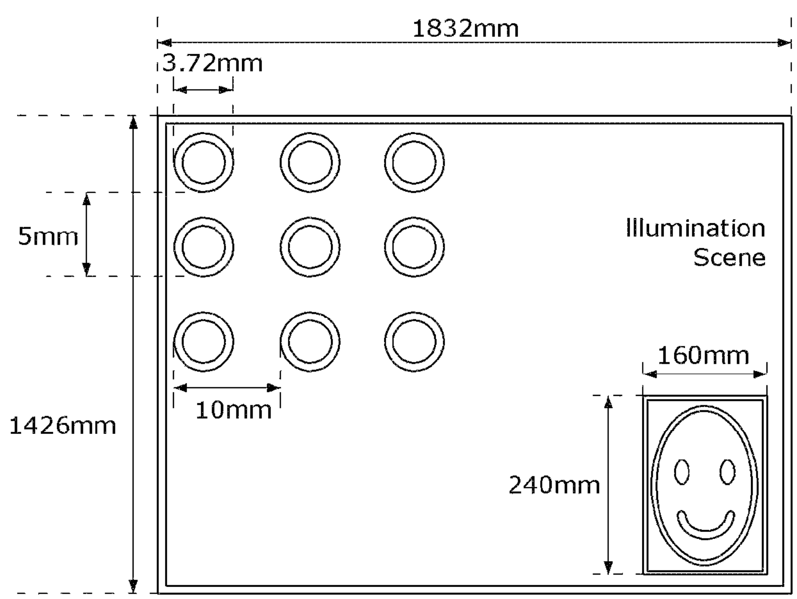

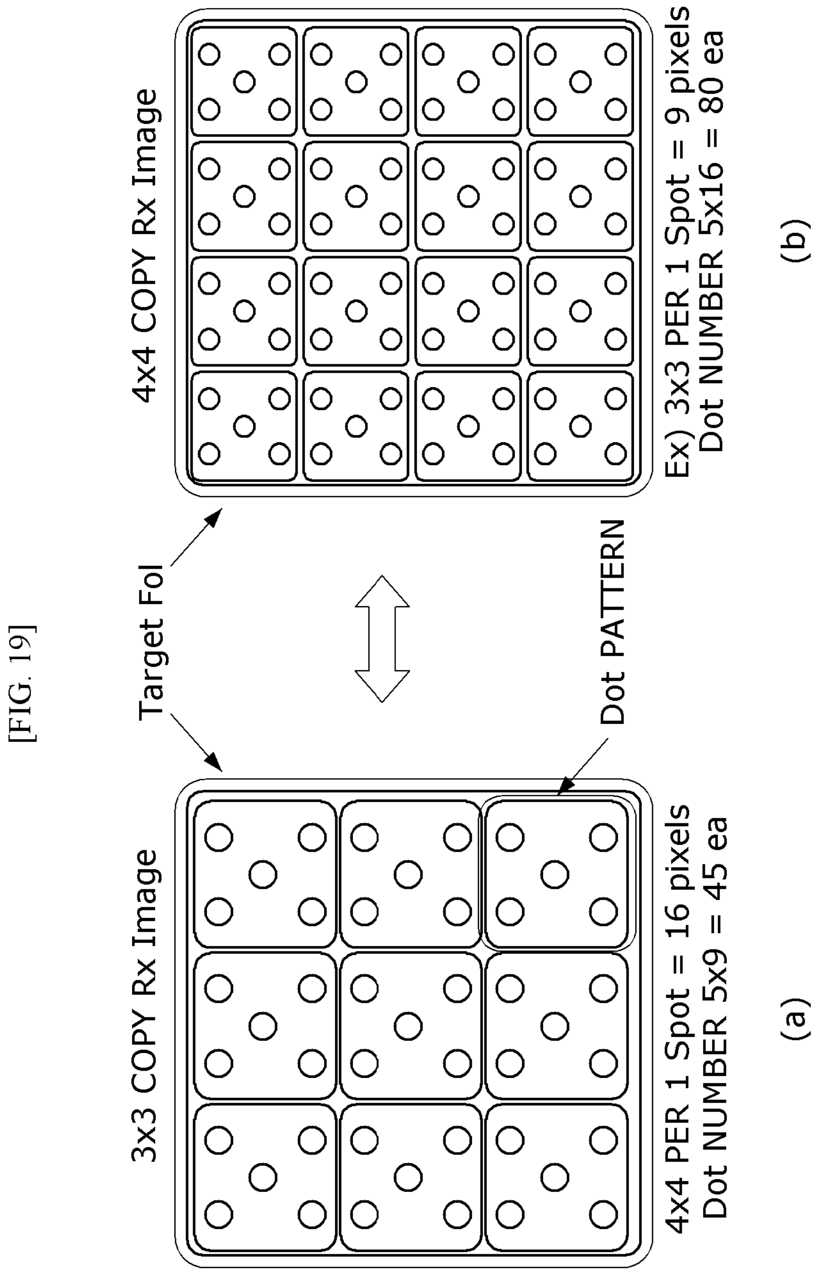
[FIG. 19]
Target Fol
Dot PATTERN
3x3 COPY Rx Image
4x4 PER 1 Spot = 16 pixels
Dot NUMBER 5x9 = 45 ea
(a)
4x4 COPY Rx Image
Ex) 3x3 PER 1 Spot = 9 pixels
Dot NUMBER 5x16 = 80 ea
(b)

[FIG. 20]
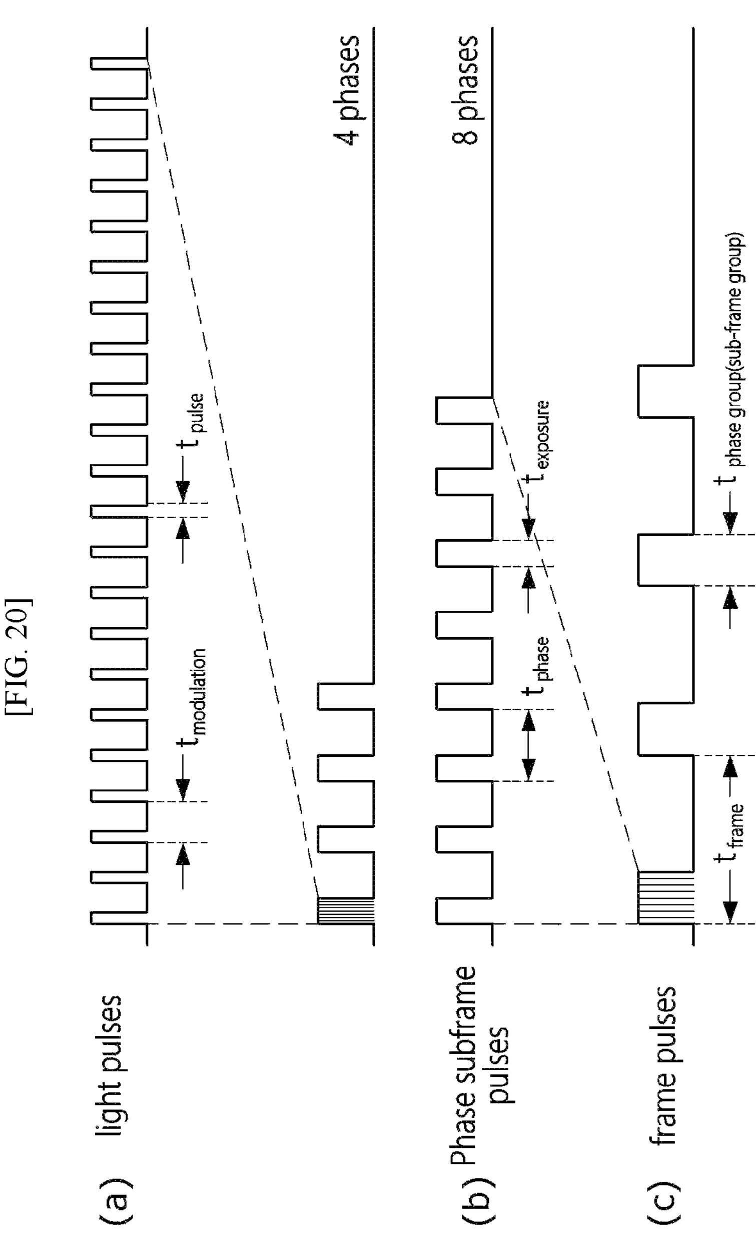

[FIG. 21]
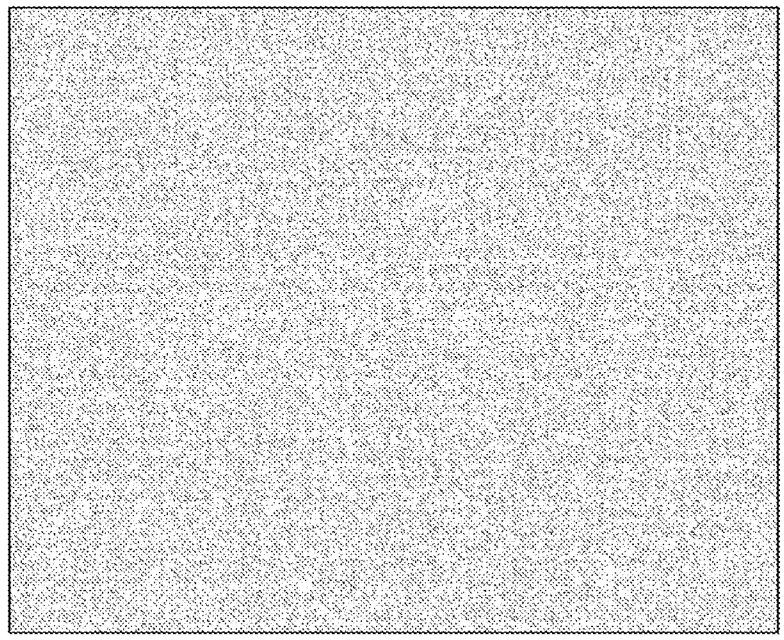
[FIG. 22]
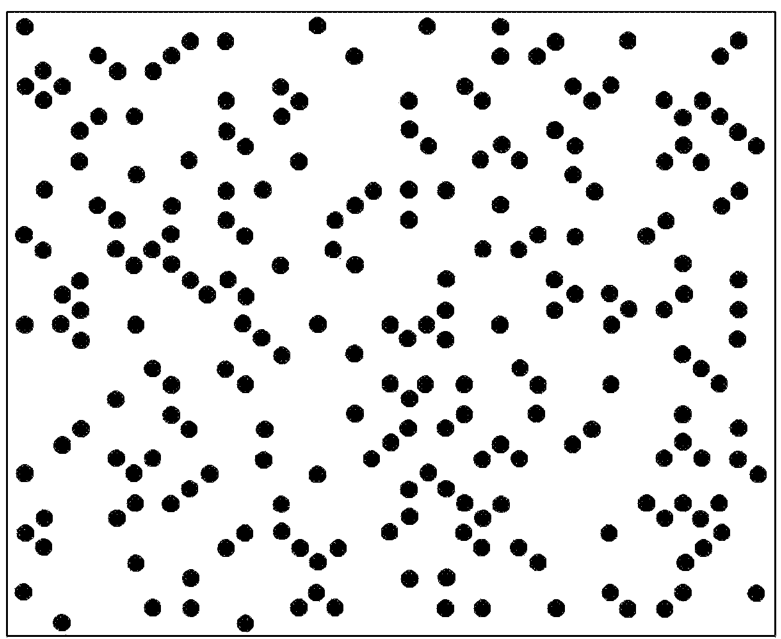

[FIG. 23]
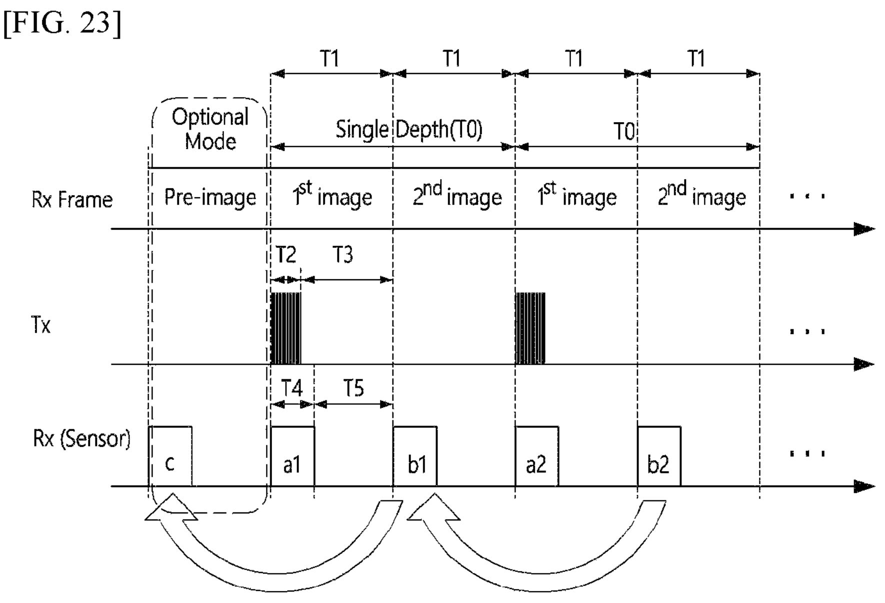

[FIG. 24]
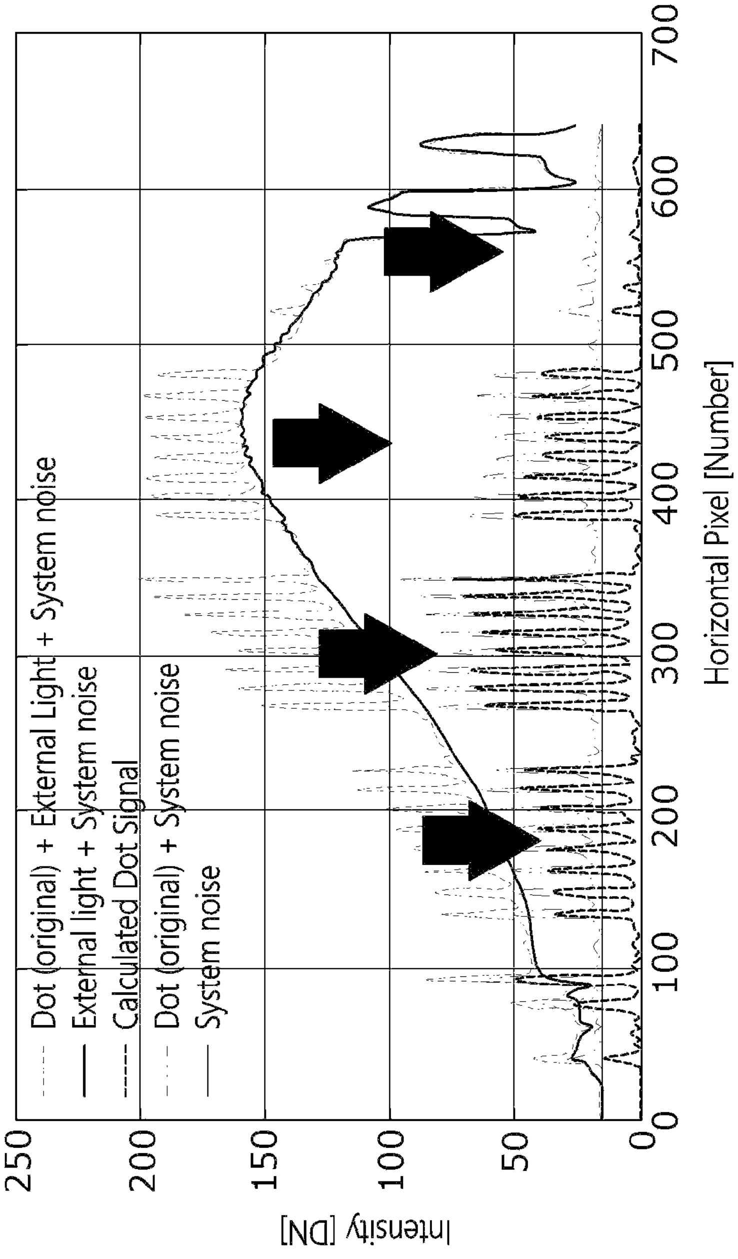
Dot (original) + External Light + System noise
External light + System noise
Calculated Dot Signal
Dot (original) + System noise
System noise
Intensity [DN]
Horizontal Pixel [Number]
0
50
100
150
200
250
0
100
200
300
400
500
600
700

[FIG. 25]
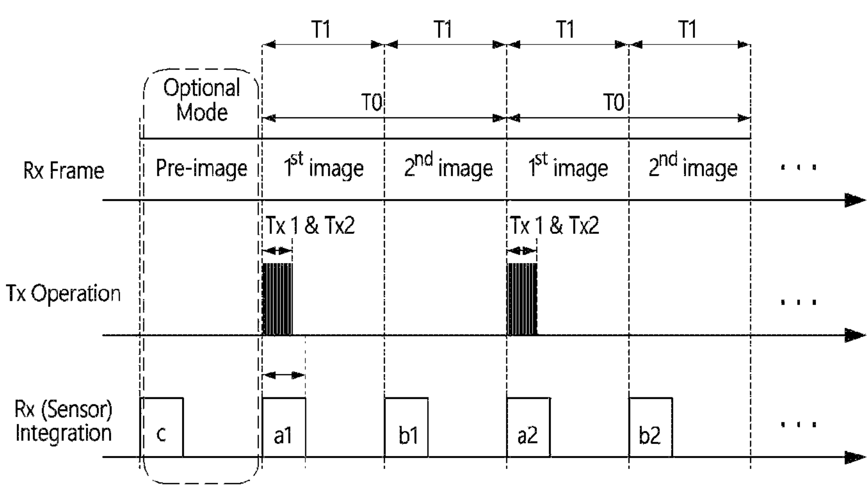
[FIG. 26]
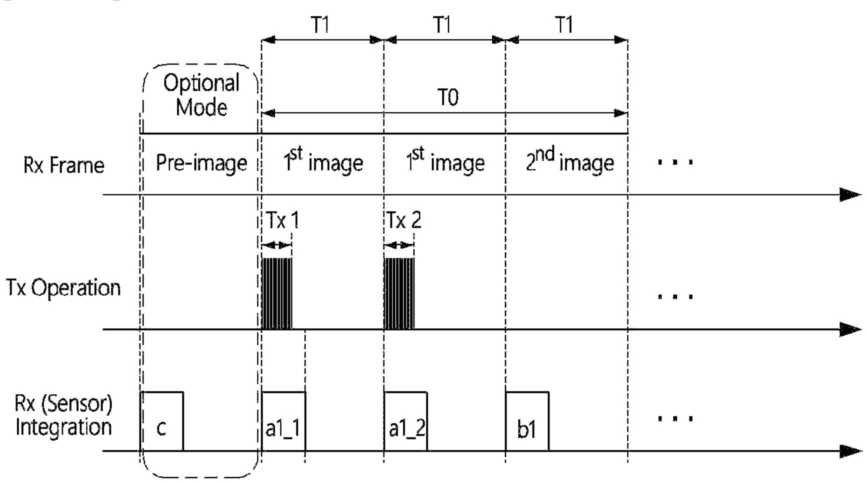

CAMERA DEVICE

CROSS REFERENCE TO RELATED APPLICATIONS

This application is the National Phase of PCT International Application No. PCT/KR2022/014780, filed on Sep. 30, 2022, which claims priority under 35 U.S.C. 119(a) to Patent Application No. 10-2021-0130090, filed in the Republic of Korea on Sep. 30, 2021, and Patent Application No. 10-2021-0155813, filed in the Republic of Korea on Nov. 12, 2021, all of which are hereby expressly incorporated by reference into the present application.

TECHNICAL FIELD

The present invention relates to a camera device.

BACKGROUND ART

Three-dimensional content is used in various fields such as education, manufacturing, autonomous driving, and the like in addition to the fields of games and cultures, and a depth map is required in order to obtain three-dimensional content. A depth map is information indicating a spatial distance and indicates perspective information from one dot to another dot in a two-dimensional image. As technology for obtaining the depth map, a structured light method, a method using a stereo camera, a time of flight (ToF) method, and the like are used.

Among the methods, according to the structured light method, infrared (IR) structured light with a predetermined pattern distinguished from surrounding illumination is emitted to an object, light signals reflected by the object are received, and a difference is analyzed to calculate a distance.

Although the method of emitting IR structured light to an object has relatively high accuracy at a short distance when compared to other methods, since the accuracy becomes significantly lower as a distance increases, there is a limitation that an operable distance is small.

Technical Problem

The present invention is directed to providing a camera device for obtaining a depth map.

Technical Solution

One aspect of the present invention provides a camera device including a light output unit which emits light signals having a predetermined pattern to an object, a light input unit which receives light signals reflected by the object, a depth map generation unit which generates a depth map of the object using the light signal input to the light input unit, and a control unit which controls the light output unit, the light input unit, and the depth map generation unit, wherein the light output unit includes a plurality of light sources including a first light source and a second light source, the light input unit includes an image sensor, the first light source and the second light source are symmetrically disposed with the image sensor interposed therebetween, the first light source outputs first light signals having a first pattern formed of a plurality of dots, the second light source outputs second light signals having a second pattern formed of a plurality of dots, and the plurality of dots forming the first pattern and the plurality of dots forming the second pattern are projected to positions which do not overlap mutually on the object.

The first light source and the second light source may be driven simultaneously.

The first light source and the second light source may be driven alternately.

The first pattern and the second pattern may be the same pattern.

The first light signal and the second light signal may be infrared (IR) light signals.

Each of the first light source and the second light source may include a vertical cavity surface emitting laser (VCSEL).

The plurality of light sources may further include a third light source and a fourth light source symmetrically disposed with respect to the image sensor, the third light source may output third light signals having a third pattern formed of a plurality of dots, the fourth light source may output fourth light signals having a fourth pattern formed of a plurality of dots, and the plurality of dots forming the third pattern and the plurality of dots forming the fourth pattern may be projected to positions, which do not overlap mutually, on the object.

A distance between the first light source and the second light source may be the same as a distance between the third light source and the fourth light source.

A distance between the first light source and the second light source may be different from a distance between the third light source and the fourth light source.

The control unit may control only some of the plurality of light sources to be driven according to information input through a user interface.

The control unit may control some of or all the plurality of light sources to be driven according to a depth map generated by the depth map generation unit.

The plurality of dots forming the first pattern and the plurality of dots forming the second pattern may be received to not mutually overlap on the image sensor.

The image sensor may include a first region in which all the plurality of dots forming the first pattern and the plurality of dots forming the second pattern are received and a second region in which the plurality of dots forming the first pattern or the plurality of dots forming the second pattern are received, and the depth map generation unit may generate the depth map based on light signals received in the first region.

Another aspect of the present invention provides a camera device including a light output unit which emits a light signal to an object, a light input unit including an image sensor which receives light signals reflected by the object, a depth map generation unit which generates a depth map of the object using the light signal input to the light input unit, and a control unit which controls the light output unit, the light input unit, and the depth map generation unit, wherein a turn-on cycle of the light output unit is a plurality of times an integration cycle of the image sensor, and the depth map generation unit generates the depth map using a first image obtained for an integration time of the image sensor which overlaps a turn-on time of the light output unit and a second image obtained for an integration time of the image sensor which does not overlap the turn-on time of the light output unit.

The light output unit may include a light source, and a turn-on cycle of the light source may be two times the integration cycle of the image sensor.

The first image may include the light signal and background noise, the second image may include the background noise, and the depth map may be generated using a difference between the first image and the second image.

The turn-on time of the light source for the first image may partially overlap the integration time of the image sensor for the first image.

The depth map generation unit may extract an amount of a change in background noise using the second image cyclically obtained for the integration time of the image sensor which does not overlap the turn-on time of the light output unit.

The depth map generation unit may obtain a pre-background image for a pre-integration time of the image sensor before an initial turn-on time of the light source.

The light source may output structured light having a predetermined pattern formed of a plurality of dots.

The light source may output a surface lighting pattern.

The light output unit may include a first light source and a second light source, a turn-on time of the first light source may overlap a turn-on time of the second light source, the first image may be an image obtained for an integration time of the image sensor which overlaps the turn-on time of the first light source and the turn-on time of the second light source, and the second image may be an image obtained for an integration time of the image sensor which does not overlap the turn-on time of the first light source and the turn-on time of the second light source.

The light output unit may include a first light source and a second light source, a turn-on time of the first light source may not overlap a turn-on time of the second light source, the first image may include an image obtained for an integration time of the image sensor which overlaps the turn-on time of the first light source and an image obtained for an integration time of the image sensor which overlaps the turn-on time of the second light source, and the second image may be an image obtained for an integration time of the image sensor which does not overlap the turn-on time of the first light source and the turn-on time of the second light source.

Each of the first light source and the second light source may output structured light having a predetermined pattern formed of a plurality of dots.

Each of the first light source and the second light source may output a surface lighting pattern.

The first light source may be a light source which outputs structured light having a predetermined pattern formed of a plurality of dots, and the second light source may be a light source which outputs a surface lighting pattern.

Advantageous Effects

According to an embodiment of the present invention, a camera device for obtaining a depth map can be obtained. In particular, according to the embodiment of the present invention, a depth map with high accuracy can be obtained using a structured light method even at a medium distance or longer.

According to an embodiment of the present invention, a camera device capable of obtaining a depth map with high accuracy in both an indoor environment and an outdoor environment can be obtained. According to the embodiment of the present invention, an accurate depth map can be obtained by effectively removing background illumination in an outdoor environment in real time.

DESCRIPTION OF DRAWINGS

FIG. 1 is a block diagram illustrating a camera device according to an embodiment of the present invention.

FIG. 2 is a schematic cross-sectional view illustrating the camera device according to the embodiment of the present invention.

FIG. 3 shows one example of light signals having a predetermined pattern.

FIG. 4 is a view for describing a principle of generating a depth map using structured light.

FIG. 5 is a schematic cross-sectional view illustrating a camera device according to one embodiment of the present invention.

FIGS. 6A to 6D show various examples of positional relationships between an image sensor and a plurality of light sources in the camera device according to one embodiment of the present invention.

FIG. 7 shows one example of a pattern according to structured light emitted by the plurality of light sources in the camera device according to one embodiment of the present invention.

FIGS. 8 to 10 show various examples of a method of driving a plurality of light sources in a camera device according to one embodiment of the present invention.

FIG. 11 shows one example of a structured light pattern received by the image sensor in the camera device according to one embodiment of the present invention.

FIG. 12 is a schematic cross-sectional view illustrating a camera device according to another embodiment of the present invention.

FIGS. 13 to 15 show examples of adjusting the number of light sources for driving a camera device according to one embodiment of the present invention.

FIG. 16 shows a correlation between a distance and an intensity.

FIG. 17 shows an emitter array of a generally used vertical cavity surface emitting laser (VCSEL).

FIG. 18 is a view for describing the number of dots required in an example in which a target distance is 1 m and an angle of view of a field of interest (FoI) is 100°.

FIG. 19 is a set of views for describing a change in size of a dot in an image sensor according to pattern copy.

FIGS. 20 to 22 are views for describing an output light signal output by a camera device according to still another embodiment of the present invention.

FIG. 23 shows a driving sequence of a light source and an image sensor of a camera device according to yet another embodiment of the present invention.

FIG. 24 shows a result of a simulation in which a background noise is removed in a camera device according to yet another embodiment of the present invention.

FIG. 25 shows a driving sequence of a light source and an image sensor of a camera device according to yet another embodiment of the present invention.

FIG. 26 shows a driving sequence of a light source and an image sensor of the camera device according to yet another embodiment of the present invention.

MODES OF THE INVENTION

Hereinafter, exemplary embodiments of the present invention will be described with reference to the accompanying drawings.

However, the technical spirit of the present invention is not limited to some embodiments which will be described and may be implemented in a variety of different forms, and one or more components of the embodiments may be selectively combined, substituted, and used within the range of the technical spirit of the present invention.

In addition, unless clearly and specifically defined otherwise by the context, all terms (including technical and scientific terms) used herein can be interpreted as having meanings customarily understood by those skilled in the art, and the meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless specifically indicated otherwise by the context, singular forms include plural forms, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" may be used.

The terms are only to distinguish one component from another component, and the essence, order, and the like of the components are not limited by the terms.

In addition, it should be understood that, when a first component is referred to as being "connected," "coupled," or "linked" to a second component, such a description may include both a case in which the first component is directly connected, coupled, or linked to the second component, and a case in which the first component is connected or coupled to the second component with a third component disposed therebetween.

In addition, when a first component is described as being formed or disposed "on" or "under" a second component, such a description includes both a case in which the two components are formed or disposed in direct contact with each other and a case in which one or more other components are interposed between the two components. In addition, when the first component is described as being formed "on or under" the second component, such a description may include a case in which the first component is formed at an upper side or a lower side with respect to the second component.

A camera device according to an embodiment of the present invention may be used interchangeably with a depth map extraction device, a three-dimensional information extraction device, or the like.

FIG. 1 is a block diagram illustrating a camera device according to an embodiment of the present invention, and FIG. 2 is a schematic cross-sectional view illustrating the camera device according to the embodiment of the present invention.

Referring to FIGS. 1 and 2, a camera device 1 according to the embodiment of the present invention includes a light output unit 10, a light input unit 20, a depth map generation unit 30, and a control unit 40.

The light output unit 10 generates an output light signal and emits the output light signal to an object. In this case, the light output unit 10 may output light signals having a predetermined pattern. FIG. 3 shows one example of light signals having a predetermined pattern. Referring to FIG. 3, light signals having a predetermined pattern may be formed of a plurality of dots and referred to as structured light. In this case, the predetermined pattern may be a unique pattern and generated by a pre-designed algorithm. The light signals having the predetermined pattern may be an infrared (IR) light signal. In the present specification, output light may be light output by the light output unit 10 to be incident on the object, and input light may be light which is output by the light output unit 10, reaches the object, is reflected by the object, and is input to the light input unit 20. From a view point of the object, the output light may be incident light, and the input light may be reflected light.

The light output unit 10 may include a light source 100 and a lens assembly 110.

First, the light source 100 generates light. The light generated by the light source 100 may be infrared light with a wavelength of 770 to 3000 nm or visible light with a wavelength of 380 to 770 nm. The light source 100 may use light emitting diodes (LEDs) and have a form in which the plurality of LEDs are arrayed in a predetermined pattern. In addition, the light source 100 may include organic light emitting diodes (OLEDs) or laser diodes (LDs). Alternatively, the light source 100 may be a vertical cavity surface emitting laser (VCSEL). The VCSEL is one laser diode which converts an electrical signal into a light signal and may output a signal with a wavelength of about 800 to 1000 nm, for example, about 850 nm or 940 nm. One VCSEL may include a plurality of emitters, for example, several hundreds of emitters, and output a pattern formed of dots generated by the emitters. The light source 100 may be repeatedly turned on and off at a predetermined time interval, and the predetermined time interval may be a frequency of an output light signal.

The lens assembly 110 may collect light output by the light source 100 and output the collected light to the outside. The lens assembly 110 may be disposed above the light source 100 to be spaced apart from the light source 100. In this case, "above the light source 100" may mean a side to which light is output by the light source 100. The lens assembly 110 may include at least one lens. When the lens assembly 110 includes a plurality of lenses, the lenses may be aligned based on a central axis to constitute an optical system. In this case, the central axis may be the same as an optical axis of the optical system.

The lens assembly 110 may be accommodated or supported in a housing 120. According to one embodiment, the housing 120 may be coupled to a driving module (not shown), and the lens assembly 110 may be moved in an optical axis direction or a direction perpendicular to the optical axis by the driving module (not shown).

Meanwhile, the light input unit 20 receives light reflected by the object. To this end, the light input unit 20 may include a lens assembly 130 which collects input light reflected by the object, a filter (not shown), and an image sensor 140 which converts the input light passing through the lens assembly 130 into an electrical signal, and the lens assembly 130, the filter (not shown), and the image sensor 140 may be accommodated or supported in a housing 150. The housing 120 of the light output unit 10 and the housing 150 of the light input unit 20 are illustrated as being spaced apart from each other but are not limited thereto, and the housing 120 of the light output unit 10 and the housing 150 of the light input unit 20 may be an integrated housing.

An optical axis of the lens assembly 130 may be aligned with an optical axis of the image sensor 140. The filter (not shown) may be disposed between the lens assembly 130 and the image sensor 140 and may filter light having a predetermined wavelength range. For example, the filter (not shown) may allow light within a wavelength band of output light output by the light output unit 10 to be transmitted.

The image sensor 140 may receive an input light signal according to a flashing cycle of the light source 100. The image sensor 140 may be formed in a structure in which a plurality of pixels are arrayed in the grid form. The image sensor 140 may be a complementary metal oxide semiconductor (CMOS) image sensor or a charge coupled device (CCD) image sensor.

The light input unit 20 may be disposed parallel to the light output unit 10. The light input unit 20 may be disposed beside the light output unit 10. The light input unit 20 may be disposed in the same direction as the light output unit 10.

The depth map generation unit 30 may generate a depth map of the object using an input light signal input to the light input unit 20. FIG. 4 is a view for describing a principle of generating a depth map using structured light. As described above, in the present specification, structured light means light signals having a predetermined pattern formed of a plurality of dots. Referring to FIG. 4, an object distance h' between the camera device 1 and the object may be changed according to a disparity Δx between dots forming structured light. Accordingly, accuracy of the disparity may affect accuracy of a depth map. More specifically, extraction of a depth map using structured light may follow Expressions below.

$$b:\Delta x = h:(h'-h) \quad \text{[Expression 1]}$$

$$\Delta x = \frac{b}{h}(h'-h) \quad \text{[Expression 2]}$$

$$h' = h\left(\frac{\Delta x}{b}+1\right) \quad \text{[Expression 3]}$$

In this case, h is a reference distance, h' is an object distance, b is a length of a baseline, and Δx is a disparity.

Referring to Expressions 1 to 3, it can be seen that the length b of the baseline affects the disparity, and the disparity per a unit length of the object distance h' increases as a field of view (FoV) decreases and the baseline increases. When a size of the object is smaller than half of the baseline, a dot in a predetermined pattern may precede an adjacent dot due to the disparity, and as the object distance increases, the disparity may decrease. Accordingly, the disparity needs to be extracted based on a center of dots in order to accurately calculate a depth map.

The control unit 40 controls driving of the light output unit 10, the light input unit 20, and the depth map generation unit 30. The depth map generation unit 30 and the control unit 40 may be implemented in the form of a printed circuit board (PCB) on which the light output unit 10 and the light input unit 20 are mounted. That is, the depth map generation unit 30 or the control unit 40 may be implemented as a circuit pattern or integrated circuit (IC) chip disposed on a substrate S. Alternatively, the PCB may be connected to a connector through a flexible PCB (FPCB, not shown). Alternatively, the PCB and the FPCB may be implemented as a rigid flexible PCB (RFPCB). The light source 100 of the light output unit 10 may be disposed on the substrate S and electrically connected to the circuit pattern of the substrate S. Alternatively, the control unit 40 may be included in an electronic device in which the camera device 1 according to the embodiment of the present invention is disposed. For example, the control unit 40 may be implemented in the form of an application processor (AP) of the electronic device on which the camera device 1 according to the embodiment of the present invention is mounted.

According to one embodiment of the present invention, a light output unit may include a plurality of light sources. Accordingly, a dot density can be increased to improve a spatial resolution.

FIG. 5 is a schematic cross-sectional view illustrating a camera device according to one embodiment of the present invention, FIGS. 6A to 6D show various examples of positional relationships between an image sensor and a plurality of light sources in the camera device according to one embodiment of the present invention, and FIG. 7 shows one example of a pattern according to structured light emitted by the plurality of light sources in the camera device according to one embodiment of the present invention.

A camera device 1 according to one embodiment of the present invention includes a light output unit 10, a light input unit 20, a depth map generation unit 30, and a control unit 40. For the sake of convenience in the description, repeated description of content the same as the content described with reference to FIGS. 1 to 4 will be omitted.

Referring to FIGS. 5 and 6, the light output unit 10 includes a plurality of light sources Tx, and the light input unit 20 includes an image sensor Rx.

As an example, referring to FIGS. 5 and 6A, the plurality of light sources may include a first light source Tx1 and a second light source Tx2, and the first light source Tx1 and the second light source Tx2 may be symmetrically disposed with the image sensor Rx interposed therebetween. In this case, the first light source Tx1 may output first light signals having a first pattern formed of a plurality of dots, and the second light source Tx2 may output second light signals having a second pattern formed of a plurality of dots. In this case, the first pattern and the second pattern may be unique patterns. Accordingly, the first light signals having the first pattern and the second light signals having the second pattern may each be referred to as structured light. The first light signals having the first pattern and the second light signals having the second pattern may each be infrared (IR). The first pattern and the second pattern may be generated by a pre-designed algorithm and may be the same or different. When the light source is a VCSEL, each light source may have several hundreds (for example, 300 to 500) of emitters. In this case, the plurality of dots forming the first pattern and the plurality of dots forming the second pattern are projected to positions which do not mutually overlap on an object. For example, as illustrated in FIG. 5, a portion of a region to which the first light signals having the first pattern output by the first light source Tx1 are emitted may be a portion of a region to which the second light signals having the second pattern output by the second light source Tx2 are emitted. For example, in a scene, a region to which both the first light signals and the second light signals are emitted may be referred to as a first region R1, and a region to which only one of the first light signal and the second light signal is emitted may be referred to as a second region R2. In this case, the scene may be a target region including an object. Accordingly, dots forming a first pattern and dots forming a second pattern may be mixed and projected onto the first region R1. In this case, as illustrated in FIG. 7, the dots forming the first pattern and the dots forming the second pattern may be projected not to mutually overlap in the first region R1, and thus a dot density may increase in the first region R1 to improve a spatial resolution. In FIG. 7, dots of different colors or shades indicate dots projected by different light sources.

In order for the plurality of dots forming the first pattern and the plurality of dots forming the second pattern to be projected to the positions, which do not overlap mutually, on the object, the first pattern and the second pattern may be the same or different. In order for the plurality of dots forming the first pattern and the plurality of dots forming the second pattern to be projected to the positions, which do not overlap mutually, on the object, a distance between the first light source Tx1 and the second light source Tx2 may be adjusted in advance in association with the first pattern and the second pattern.

Meanwhile, according to the embodiment of the present invention, as illustrated in FIG. 6B, the plurality of light sources may further include a third light source Tx3 and a fourth light source Tx4 symmetrically disposed with respect to the image sensor Rx, the third light source Tx3 may output third light signals having a third pattern formed of a plurality of dots, the fourth light source Tx4 may output fourth light signals having a fourth pattern formed of a plurality of dots, and the plurality of dots forming the third pattern and the plurality of dots forming the fourth pattern may be projected to positions, which do not overlap mutually, on an object. As described above, when the plurality of light sources further includes the third light source Tx3 and the fourth light source Tx4, a dot density in a scene can increase more.

In this case, the distance between the first light source Tx1 and the second light source Tx2 may be the same as a distance between the third light source Tx3 and the fourth light source Tx4. Accordingly, the same resolution may be implemented in a scene in horizontal and vertical directions. Alternatively, the distance between the first light source Tx1 and the second light source Tx2 may be different from the distance between the third light source Tx3 and the fourth light source Tx4.

Meanwhile, according to the embodiment of the present invention, as illustrated in FIGS. 6C and 6D, the plurality of light sources may further include a fifth light source Tx5 to eighth light source Tx8 symmetrically disposed with respect to the image sensor Rx. In addition, the plurality of light sources may be disposed with various numbers in any shape.

When the light output unit includes the plurality of light sources, the plurality of light sources may be driven simultaneously or alternately.

FIGS. 8 to 10 show various examples of a method of driving a plurality of light sources in a camera device according to one embodiment of the present invention. For the sake of convenience in the description, an example in which a plurality of light sources include a first light source Tx1 and a second light source Tx2 will be described, but the present invention is not limited thereto, and the same method may also be applied to three or more light sources.

Referring to FIGS. 8 to 10, an image sensor Rx may have a cyclic exposure time an, and the plurality of light sources may be driven for the exposure time. In this case, the exposure time is a period of time for which a shutter of the image sensor Rx is open, and one image may be obtained for one exposure time.

Referring to FIG. 8, the first light source Tx2 and the second light source Tx2 may be synchronized and driven simultaneously for one exposure time.

Alternatively, referring to FIG. 9, the first light source Tx1 and the second light source Tx2 may be alternately driven for one exposure time.

Accordingly, since the image sensor Rx may obtain a first pattern according to a first light signal of the first light source Tx1 and a second pattern according to a second light signal of the second light source Tx2 for one exposure time for obtaining one image, a high light density and a high spatial resolution due to the high light density can be obtained. In this case, a plurality of dots forming the first pattern and a plurality of dots forming the second pattern need to be designed to not mutually overlap on the image sensor Rx.

Alternatively, referring to FIG. 10, the first light source Tx1 may be designed to be driven for one exposure time, and the second light source Tx2 may be designed to be driven for another exposure time.

FIG. 11 shows one example of a structured light pattern received by the image sensor in the camera device according to one embodiment of the present invention.

Referring to FIG. 11, the plurality of dots forming the first pattern and the plurality of dots forming the second pattern may be received to not mutually overlap on the image sensor Rx. Meanwhile, as described above, a portion of a region to which the first light signals having the first pattern output by the first light source Tx1 are emitted may become a portion of a region to which the second light signals having the second pattern output by second light source Tx2 are emitted. Accordingly, a region in which all the dots forming the first pattern and the dots forming the second pattern are disposed may be a first detection region A1, and a region in which only one dots of the dots forming the first pattern and one dots of the dots forming the second pattern are disposed may be second detection regions A2.

According to one embodiment of the present invention, a depth map generation unit 30 may generate a depth map based on light signals received in the first detection region A1. Accordingly, since only a depth map of a region having a high dot density is extracted, accurate and fast calculation is possible.

FIG. 12 is a schematic cross-sectional view illustrating a camera device according to another embodiment of the present invention.

A camera device 1 according to another embodiment of the present invention includes a light output unit 10, a light input unit 20, a depth map generation unit 30, and a control unit 40. For the sake of convenience in the description, repeated description of content the same as the content described with reference to FIGS. 1 to 11 will be omitted.

Referring to FIG. 12, the light output unit 10 includes a plurality of light sources Tx, and the light input unit 20 includes an image sensor Rx. In this case, the plurality of light sources Tx1 and Tx2 may be symmetrically disposed with the image sensor Rx interposed therebetween. In this case, the first light source Tx1 may output first light signals having a first pattern formed of a plurality of dots, and the second light source Tx2 may output second light signals having a second pattern formed of a plurality of dots. In this case, the first pattern and the second pattern may be unique patterns. Accordingly, the first light signals having the first pattern and the second light signals having the second pattern may each be referred to as structured light. In this case, the plurality of light sources which output the structured light may be disposed as illustrated in FIGS. 6A to 6D. Meanwhile, according to the embodiment of the present invention, the light output unit 10 may further include an additional light source Flood Tx which outputs a surface lighting pattern. The surface lighting pattern has a form in which light spreads uniformly in a predetermined region and may be interchangeably used with a flood lighting pattern, a surface light source pattern, or the like. In this case, "uniformly" does not mean that the same amount of light is emitted to a space to which the light is emitted but may mean that light spreads continuously in a space. In the case of the flood lighting pattern, since light spreads uniformly (continuously) in a space, when light with the flood lighting pattern is emitted to an object, there is an advantage that a depth map with high resolution can be obtained. In the present specification, the additional light source which outputs the surface lighting pattern may be referred to as a flood light source Flood Tx. According to the embodiment of the present invention, a plurality of flood light sources Flood Tx may be disposed with the plurality of light sources Tx and the image sensor interposed therebetween. Accordingly, the image sensor may mix information obtained from the flood light sources Flood Tx and information obtained from the light sources Tx using a structured light method in order to extract a depth map, and thus a more precise depth map can be extracted Meanwhile, according to the embodiment of the present invention, the light output unit includes the plurality of light sources, and the number of the light sources to be driven may be adjusted properly.

FIGS. 13 to 15 show examples of adjusting the number of light sources for driving a camera device according to one embodiment of the present invention.

Referring to FIG. 13, a light output unit 10 drives light sources according to the preset number, cycle, or order thereof (S1300) and, when receiving a change request through a user interface (S1310), may change the preset number, cycle, or order of the light sources (S1320). As an example, in a preset example in which all the plurality of light sources are driven simultaneously, a change request may be received through the user interface. For example, in a case in which short-distance recognition is required, when all the light sources are driven simultaneously, a dot density in a scene may become higher than necessary, and thus an amount of computation may become unnecessarily large. When a user inputs a change request through the user interface in order to prevent such a problem, a control unit may control only some of the plurality of light sources to be driven or control the plurality of light sources to be driven alternately. Conversely, in a preset example in which some of the plurality of light sources are driven, a change request may be received through the user interface. For example, in a case in which recognition at a medium distance or longer, when only some of the plurality of light sources are driven, a dot density in a scene becomes low, and thus a spatial resolution may be lowered. When the user inputs a change request through the user interface in order to prevent such a problem, the control unit may control all the plurality of light sources to be driven simultaneously.

Alternatively, the light output unit 10 may drive the light sources according to the preset number, cycle, or order, and may change the number, cycle, or order of the light sources according to a depth map generated through a depth map generation unit.

As an example, referring to FIG. 14, in a preset case in which all the plurality of light sources are driven simultaneously (S1400), a depth map generation unit 30 may generate a depth map using light signals which are output by the plurality of light sources, reflected by an object, and incident on an image sensor (S1410). In this case, in a case in which the depth map is generated at a distance smaller than or equal to a predetermined distance, that is, the object is present at a short distance (S1420), when all the light sources are driven simultaneously, a dot density in a scene becomes higher than necessary, and thus an amount of computation becomes large unnecessarily. In order to prevent such a problem, the control unit 40 may control only some of the plurality of light sources to be driven or control the plurality of light sources to be driven alternately (S1430).

Conversely, referring to FIG. 15, in a preset case in which some of the plurality of light sources are driven (S1500), the depth map generation unit 30 may generate a depth map using light signals which are output by the plurality of light sources, reflected by an object, and incident on the image sensor (S1510). In this case, in a case in which the depth map is generated at a distance greater than or equal to a predetermined distance, that is, the object is present at a medium distance or longer (S1520), when only some of the plurality of light sources are driven, a dot density in a scene may be lowered, and thus a spatial resolution may be lowered. In order to prevent such a problem, the control unit may control all the plurality of light sources to be driven simultaneously (S1530).

The camera device according to the embodiment of the present invention may be applied when a precise depth map needs to be extracted at a medium distance or longer, for example, a distance of 20 cm or more. In this case, one example of the precise depth map may be facial recognition, but the facial recognition is only exemplary, and the present invention is not limited thereto.

FIG. 16 and Expression 4 show a correlation between a distance and an intensity.

$$D_{th} \geq \left(\frac{P_{avg}}{N}\right) / R^2 \quad \text{[Expression 4]}$$

In this case, $D_{th}$ is a threshold value of a light intensity through which a depth map may be extracted, $P_{avg}$ is average light power output by a light source, N is the number of toral dots output by the light source, that is, the number of emitters in one light source, and R is a target distance.

Referring to FIG. 16, it can be seen that a light intensity is sharply lowered as a distance increases, and it can be seen that, when a distance is 0.2 m or more, a light intensity may be a threshold value $D_{th}$ or less.

Referring to FIG. 16 and Expression 4, after the average light power $P_{avg}$ output by the light source is divided by the number N of the emitters in the light source, when an intensity per dot is smaller than the threshold value $D_{th}$ at a target distance R, a camera device according to the embodiment of the present invention may be applied. An example of a case in which the camera device includes two light sources will be described. In a case in which each of the light sources includes N emitters, when the light source is controlled to drive only N/2 emitters, light output by the light source may have an intensity greater than or equal to the threshold value $D_{th}$, as a result, a precise depth map may be extracted at a distance greater than or equal to a medium distance.

The camera device according to the embodiment of the present invention may be applied when the number of dots required to extract a depth map is greater than the number of emitters included in one light source. FIG. 17 shows an emitter array of a generally used VCSEL. Referring to FIG. 17, one VCSEL may include 361 emitters. Meanwhile, as an angle of view of a field of interest (FoI) becomes large, and a distance increases, the number of dots required to extract a depth map increases. For example, FIG. 18 is a view for describing the number of dots in an example in which a target distance is 1 m and an angle of view of an FoI is 100°. Referring to FIG. 18, a case in which distances between dots in a scene are a horizontal distance of 10 mm and a vertical distance of 5 mm is a target, the number of dots in a scene having a width of 1832 mm and a length of 1426 mm is about 50000. In this case, it may be difficult to satisfy the number of dots of a desired level by only copying a pattern using a diffractive optical element (DOE). Accordingly, when a plurality of light sources and the DOE are combined, a depth map of a wide FOI may be extracted at a medium distance or longer.

Meanwhile, in the example of FIG. 18, when an object with a size having a width of 160 mm and a length of 240 mm needs to be authenticated in the scene having a width of 1832 mm and a length of 1426 mm, the required number of dots is 768. In this case, when two light sources are used, a light intensity does not need to be reduced. Accordingly, a precise depth map (for example, facial recognition) may be extracted even at a medium distance or longer (for example, a distance of 1 m).

The camera device according to the embodiment of the present invention can improve a resolution of an image sensor. For example, the image sensor recognizes received dots of a pattern reflected by an object. In this case, the image sensor may detect only dots with a predetermined size or more. That is, a dot on the image sensor may be accurately detected when the dot is formed by a predetermined number of pixels or more. When a pattern is copied using a DOE or the like in order to satisfy a dot density, a size of a dot is reduced as the number of copy times increases. FIG. 19 is a set of views for describing a change in size of a dot in an image sensor according to pattern copy. Referring to FIG. 19A, it can be seen that, when 3×3 copy is performed, the total number of dots on the image sensor is 45, and referring to FIG. 19B, it can be seen that, when 4×4 copy is performed, the total number of dots on the image sensor is 80. Accordingly, it can be seen that, as the number of copies increases, a dot density increases. However, as the dot density increases, a size of the dot is reduced. When a plurality of light sources are used in order to solve such a problem, the number of dots may not decrease while increasing a dot density. Therefore, according to the embodiment of the present invention, a resolution of the image sensor can be improved.

Meanwhile, as the utilization of a three-dimensional camera device increases, use of the three-dimensional camera device is increasing indoors and outdoors. In an outdoor environment, background illumination such as sunlight is present. Accordingly, an image sensor of the three-dimensional camera device receives both light output by a light source and the background illumination, and such background illumination acts as noise while extracting a depth map.

In order to remove the background illumination received by the image sensor, a noise filtering technique using a threshold value method is being tried, but there is a problem that it is difficult to effectively remove background illumination with various forms and intensities.

Hereinafter, still another embodiment of the present invention for effectively remove background illumination will be described.

FIGS. 20 to 22 are views for describing an output light signal output by a camera device according to still another embodiment of the present invention. Repeated description of content the same as the content described with reference to FIGS. 1 to 19 will be omitted. In particular, all or some of the content described with reference to FIGS. 1 and 2 may be applied to specific descriptions of the camera device according to still another embodiment of the present invention.

Referring to FIG. 20A, a light output unit 10 may generate light pulses at a predetermined cycle. The light output unit 10 may generate light pulses having a predetermined pulse width $t_{pulse}$ at a predetermined pulse repetition cycle $t_{modulation}$.

Referring to FIG. 20B, the light output unit 10 may group a predetermined number of light pulses to generate one phase pulse. The light output unit 10 may generate phase pulses having predetermined phase pulse widths $t_{exposure}$, $t_{illumination}$, and $t_{integration}$ at a predetermined phase pulse cycle $t_{phase}$. In this case, one phase pulse cycle $t_{phase}$ may correspond to one subframe. The subframe may be referred to as a phase frame. The predetermined number of phase pulse cycles may be grouped. A method of grouping four phase pulse cycles $t_{phase}$ may be referred to as a 4-phase method. A method of grouping eight cycles $t_{pphase}$ may be referred to as an 8-phase method.

Referring to FIG. 20C, the light output unit 10 may group the predetermined number of phase pulses to generate one frame pulse. The light output unit 10 may generate frame pulses having a predetermined frame pulse width $t_{phase}$ group (subframe group) at a predetermined frame pulse cycle $t_{frame}$. In this case, one frame pulse cycle $t_{frame}$ may correspond to one frame. Accordingly, when images of an objects are captured at 10 FPS, the frame pulse cycle $t_{frame}$ may be repeated ten times per one sec. In the 4-phase method, four subframes may be included in one frame. That is, one frame may be generated through four subframes. In the 8-phase method, eight subframes may be included in one frame. That is, one frame may be generated through eight subframes.

For the sake of the above description, terms such as light pulse, phase pulse, and frame pulse have been used, but the present invention is not limited thereto.

The light output unit 10 may include at least one of a light source having a surface lighting pattern and a light source having a point lighting pattern. The light source having the surface lighting pattern may be a light source for time of flight (ToF), and the light source having the point lighting pattern may be a light source using a structured light method.

FIG. 21 shows one example of a surface lighting pattern. Referring to FIG. 21, the surface lighting pattern has a form in which light spreads uniformly in a predetermined region and may be interchangeably used with a flood lighting pattern, a surface light source pattern, or the like. In this case, "uniformly" does not mean that the same amount of light is emitted to a space to which the light is emitted but may mean that light spreads continuously in a space. In the case of the flood lighting pattern, since light spreads uniformly (continuously) in a space, when light with the flood lighting pattern is emitted to an object, there is an advantage that a depth map with high resolution can be obtained. FIG. 22 shows one example of a light signal with a predetermined pattern which is a point lighting pattern. Referring to FIG. 22, the point lighting pattern may mean the array form in which spots are spaced a predetermined distance from each other in a predetermined region and may be interchangeably used with a spot lighting pattern, a point light source pattern, or the like. In this case, the point lighting pattern may be a pattern in which light is locally collected in a space, that is, a pattern in which light does not spread continuously and is concentrated locally in a space. In the case of the point lighting pattern, since light is concentrated locally, an amount of light of the spot is large. Accordingly, there is an advantage that a high precise depth map can be obtained even when a distance to an object is long. Referring to FIG. 22, the light signals with the predetermined pattern may be formed of a plurality of dots and referred to as structured light. In this case, the predetermined pattern may be a unique pattern and may be generated by a pre-designed algorithm. The light signals with the predetermined pattern may be IR light signals.

According to the embodiment of the present invention, a control unit 40 controls driving of a light output unit 10 and driving of a light input unit 20. Accordingly, a depth map generation unit 30 may remove noise (hereinafter, referred to as background noise) due to background illumination from a signal input to the light input unit 20 and extract only a light signal effective for extracting a depth map.

FIG. 23 shows a driving sequence of a light source and an image sensor of a camera device according to yet another embodiment of the present invention. Hereinafter, for the sake of convenience in the description, a light source 100 may be referred to as a Tx, and an image sensor 140 may be referred to as an Rx.

Referring to FIG. 23, the Tx modulates a pulse having a predetermined duty cycle to a pulse having a specific frequency and outputs the modulated pulse. Turn-on of the Tx may mean one frame pulse described with reference to FIG. 20C. A frame rate of the Rx and a trigger signal of the Tx are synchronized, the Rx and the Tx are driven, and the Tx and the Rx are set to have different frame rates. That is, a cycle of the turn-on of the Tx is set to be different from a cycle of integration of the Rx. According to the embodiment of the present invention, the frame rate of the Rx is two times or more of the frame rate of the Tx. That is, the cycle of the turn-on of the Tx is two times or more of the cycle of the integration of the Rx.

In FIG. 23, T0 denotes a period of time for which one depth map is generated, T1 denotes a frame time, T2 denotes an exposure time of the Tx, T3 denotes an idle time of the Tx, T4 denotes an integration time of the Rx, and T5 denotes a readout time of the Rx. In the present specification, T2, that is the exposure time of the Tx, may be referred to as a turn-on time of the Tx. In the present specification, T4, that is the integration time of the Rx, may be an open time of a shutter, and one image may be generated for each integration time T4 and readout time T5, that is one frame time T1.

According to yet another embodiment of the present invention, for T0 which is a period of time for which one depth map is generated, a Tx may be turned on one time, an Rx may be exposed a plurality of times, for example, two times. That is, the Tx may be turned on one time for a plurality of frame times T1, for example, two frame times T1, and the Rx may be exposed one time for each frame time T1. In this case, a turn-on time of the Tx may be synchronized with an integration time of the Rx. In this case, "synchronization" may mean that a turn-on start time of the Tx matches an integration start time of the Rx or that there is a predetermined time interval between a turn-on start time of the Tx and an integration start time of the Rx. In this case, the turn-on time of the Tx may partially overlap the integration time of the Rx. That is, the turn-on time of the Tx may be included within the integration time of the Rx, and the turn-on time of the Tx may be smaller than the integration time of the Rx. Accordingly, the Rx may prevent loss of a light signal which is output by the Tx, reflected by an object, and incident on the Rx.

According to an embodiment of the present invention, an image obtained in an integration time (for example, a1 or a2) of the Rx which overlaps a turn-on time of the Tx may include a light signal (hereinafter, may be referred to as an effective light signal), which is output by the Tx, reflected by an object, and incident on the Rx, and background noise, and an image obtained in an integration time (for example, b1 or b2) of the Rx, which does not overlap the turn-on time of the Tx, may include only background noise. According to an embodiment of the present invention, the image including the effective light signal and background noise and the image including only the background noise may be alternately captured, and the background noise may be removed using a difference between two images in real time, and an accurate depth map may be generated using only the effective light signal.

That is, a depth map generation unit 40 generates a depth map using a first image obtained for an integration time of the Rx which overlaps a turn-on time of the Tx and a second image obtained for an integration time of the Rx which does not overlap the turn-on time of the Tx. That is, a first depth map which is one depth map is generated using a first image $1^{st}$ image obtained when the Tx is turned on and a second image $2^{nd}$ image which is next to the first image $1^{st}$ image and is obtained when the Tx is turned off. As described above, since the first image includes an effective light signal and background noise, the second image includes background noise, and since a difference between the first image and the second image includes only the effective light signal, the first depth map may be generated using the difference between the first image and the second image.

Meanwhile, although the first image $1^{st}$ image which is a first image after the Tx is driven may be compared with the second image $2^{nd}$ image next to the first image $1^{st}$ image, the first image $1^{st}$ image may be compared with a background image prior to the first image $1^{st}$ image. To this end, the Rx may have a pre-integration time c before an initial turn-on time of the Tx. Accordingly, the depth map generation unit 40 may obtain a pre-background image pre-image and sequentially generate a depth map based on the pre-background image pre-image.

Meanwhile, according to an embodiment of the present invention, the depth map generation unit 40 may also calculate an amount of a change in background noise in each T0 which is the period of time for which one depth map is generated. For example, the depth map generation unit 40 may generate one depth map in each T0, which is the period of time for which the one depth map is generated, using a first image $1^{st}$ image obtained when the light source is turned on and a second image $2^{nd}$ image obtained when the light source is turned off. Accordingly, the second image may be periodically obtained for each integration time (for example, b1, b2, to bn) of the Rx which does not overlap the turn-on time of the Tx. The depth map generation unit 40 can calculate an amount of a change in background noise using a difference between sequentially generated second images.

According to an embodiment of the present invention, an amount of computation of the depth map generation unit 40 may be reduced using an amount of a change in background noise. For example, when an amount of a change in background noise is smaller than or equal to a preset value, it is determined that the change in background illumination is not large, and a depth map is generated using a value of background noise applied to a previous depth map, and when an amount of a change is greater than the present value, it is determined that the change in background illumination is large, and a depth map may be generated by compensating for a value of background noise applied to a previous depth map.

According to an embodiment of the present invention, it may also be determined whether operation of the depth map generation unit 40 is proper using an amount of a change in background noise. For example, when an amount of a change in background noise is greater than a preset value, it may be determined that the change in background illumination is large, it may be determined that current operation of the depth map generation unit 40 is not proper, and then generation of a depth map may be stopped, or a depth map may be generated by applying a predetermined compensation value.

FIG. 24 shows a result of a simulation in which a background noise is removed in a camera device according to yet another embodiment of the present invention. As illustrated in FIG. 24, both an effective light signal and background noise according to background illumination may be input to an image sensor, and an intensity recognized by the image sensor may include system noise. According to the embodiment of the present invention, when the background noise according to the background illumination and the system noise are removed from a light signal including the effective light signal, the background noise according to the background illumination, and the system noise, only the effective light signal can be obtained.

A camera device according to yet another embodiment of the present invention may be applied when a light output unit includes a plurality of light sources.

FIG. 25 shows a driving sequence of a light source and an image sensor of a camera device according to yet another embodiment of the present invention, and FIG. 26 shows a driving sequence of a light source and an image sensor of the camera device according to yet another embodiment of the present invention. For the sake of convenience in the description, repeated description of content the same as the content described with reference to FIG. 23 will be omitted.

Referring to FIGS. 25 and 26, a light output unit includes a first light source Tx1 and a second light source Tx2.

According to yet another embodiment of the present invention, each of the first light source Tx1 and the second light source Tx2 may output structured light having a predetermined pattern formed of a plurality of dots. Accordingly, a dot density per unit area may be increased to improve a spatial resolution. Although not illustrated in the drawings, the first light source Tx1 and the second light source Tx2 may be symmetrically disposed with an image sensor Rx interposed therebetween. In this case, the first light source Tx1 may output first light signals having a first pattern formed of a plurality of dots, and the second light source Tx2 may output second light signals having a second pattern formed of a plurality of dots. In this case, the first pattern and the second pattern may be unique patterns. In this case, the plurality of dots forming the first pattern and the plurality of dots forming the second pattern may be projected to positions, which do not overlap mutually, on an object.

According to another embodiment of the present invention, a first light source Tx1 may output structured light having a predetermined pattern formed of a plurality of dots, and a second light source Tx2 may be a light source for ToF. Accordingly, the first light source Tx1 may output a point lighting pattern, and the second light source Tx2 may output a surface lighting pattern. The first light source Tx1 and the second light source Tx2 may be symmetrically disposed with an image sensor Rx interposed therebetween. Alternatively, the second light source Tx2 which is the light source for ToF may be disposed between the first light source Tx1 and the image sensor Rx. Accordingly, the image sensor may mix information obtained from the first light source Tx1 using a structured light method and information obtained from the second light source Tx2 through a ToF method in order to extract a depth map. Accordingly, a more precise depth map can be extracted.

According to still another embodiment of the present invention, both a first light source Tx1 and a second light source Tx2 may be light sources for ToF. Although not illustrated in the drawings, the first light source Tx1 and the second light source Tx2 may be symmetrically disposed with an image sensor Rx interposed therebetween.

Referring to FIG. 25, a turn-on time of the first light source Tx1 overlaps a turn-on time of the second light source Tx2, and a depth map generation unit 40 may generate one depth map using a first image obtained for an integration time of the image sensor Rx which overlaps the turn-on time of the first light source Tx1 and the turn-on time of the second light source Tx2 and a second image obtained for an integration time of the image sensor Rx which does not overlap the turn-on time of the first light source Tx1 and the turn-on time of the second light source Tx2. In this case, the first light source Tx1 and the second light source T2_x_ may be driven simultaneously or alternately in the overlapping turn-on time. Accordingly, there is no loss of a frame rate for generating a depth map.

Referring to FIG. 26, a turn-on time of the first light source Tx1 does not overlap a turn-on time of the second light source Tx2, and the depth map generation unit 40 may generate one depth map using an image obtained for an integration time a1_1 of the Rx which overlaps the turn-on time of the first light source Tx1, an image obtained for an integration time a1-2 of the Rx which overlaps the turn-on time of the second light source Tx2, and an image obtained for an integration time b1 of the Rx which does not overlap the turn-on time of the first light source Tx1 and the turn-on time second light source Tx2. When each of the first light source Tx1 and the second light source Tx2 is a light source using a structured light method, a degree of design freedom of a dot pattern is high.

According to yet another embodiment of the present invention, a turn-on time of the Tx and an integration time of the Rx may be adjusted to remove background noise in real time, and thus only an effective light signal may be extracted, and a depth map with high accuracy may be obtained. The turn-on time of the Tx and the integration time of the Rx may be controlled by a control unit 30, for example, a driver IC, in a camera device 1 according to the embodiment of the present invention.

While the present invention has been mainly described above with reference to embodiments, it will be understood by those skilled in the art that the present invention is not limited to the embodiments, the embodiments are only exemplary, and various modifications and applications, which are not exemplified above, may be made within the range of the present invention without departing from the essential features of the present embodiments. For example, components specifically described in the embodiments may be implemented with modifications. In addition, it should be interpreted that differences related to such modifications and applications fall within the scope of the present invention defined by the appended claims.

REFERENCE NUMERALS

1: CAMERA DEVICE
10: LIGHT OUTPUT UNIT
20: LIGHT INPUT UNIT
30: DEPTH MAP GENERATION UNIT
40: CONTROL UNIT

The invention claimed is:

1. A camera device comprising:

a light emitter which emits light signals having a predetermined pattern to an object;

a light receiver which receives light signals reflected by the object;

a depth map generator which generates a depth map of the object using the light signals input to the light receiver; and a controller which controls the light emitter, the light receiver, and the depth map generator, wherein the light emitter includes a plurality of light sources including a first light source and a second light source, the light receiver includes an image sensor, the first light source and the second light source are symmetrically disposed with the image sensor interposed therebetween, the first light source outputs first light signals having a first pattern formed of a plurality of dots, the second light source outputs second light signals having a second pattern formed of a plurality of dots, the image sensor includes a first region in which both of the plurality of dots forming the first pattern and the plurality of dots forming the second pattern are received and a second region in which the plurality of dots forming the first pattern or the plurality of dots forming the second pattern are received, the plurality of dots forming the first pattern and the plurality of dots forming the second pattern do not overlap each other in the first region, and the depth map generator generates the depth map based on light signals received in the first region.

2. The camera device of claim 1, wherein the first light source and the second light source are driven simultaneously.

3. The camera device of claim 1, wherein the first light source and the second light source are driven alternately.

4. The camera device of claim 1, wherein the first pattern and the second pattern are the same pattern.

5. The camera device of claim 1, wherein the first light signals and the second light signals are infrared (IR) light signals.

6. The camera device of claim 1, wherein each of the first light source and the second light source includes a vertical cavity surface emitting laser (VCSEL).

7. The camera device of claim 1, wherein:

the plurality of light sources further include a third light source and a fourth light source symmetrically disposed with respect to the image sensor;

the third light source outputs third light signals having a third pattern formed of a plurality of dots;

the fourth light source outputs fourth light signals having a fourth pattern formed of a plurality of dots;

a portion of a region to which the first light signals are emitted is a first overlapping region that overlap a portion of a region to which the second light signals are emitted;

the plurality of dots forming the first pattern and the plurality of dots forming the second pattern are projected so as not to overlap each other on the object in the first overlapping region;

a portion of a region to which the third light signals are emitted is a second overlapping region that overlap a portion of a region to which the fourth light signals are emitted; and the plurality of dots forming the third pattern and the plurality of dots forming the fourth pattern are projected so as not to overlap each other on the object in the second overlapping region.

8. The camera device of claim 7, wherein a distance between the first light source and the second light source is the same as a distance between the third light source and the fourth light source.

9. The camera device of claim 7, wherein a distance between the first light source and the second light source is different from a distance between the third light source and the fourth light source.

10. The camera device of claim 1, wherein the controller controls only some of the plurality of light sources to be driven according to information input through a user interface.

11. The camera device of claim 1, wherein the controller controls some of or all the plurality of light sources to be driven according to a depth map generated by the depth map generator.

12. The camera device of claim 1, wherein a dot density of the first region is greater than a dot density of the second region.

13. The camera device of claim 1, wherein the first light signals and the second light signals are structured light.

* * * * *